United States Patent
Weisbord et al.

[11] 3,856,366
[45] Dec. 24, 1974

[54] GYROSCOPE UNIVERSAL FLEXURE SUSPENSION ASSEMBLY

[75] Inventors: Leon Weisbord, New York, N.Y.; Walter J. Krupick, Succasana, N.J.

[73] Assignee: The Singer Company, Little Falls, N.J.

[22] Filed: Jan. 8, 1973

[21] Appl. No.: 322,018

[52] U.S. Cl............................... 308/2 A, 74/5 F
[51] Int. Cl............................................ G01c 19/18
[58] Field of Search............ 74/5 F; 308/2 A; 64/11, 64/15, 27

[56] References Cited
UNITED STATES PATENTS

| | | | |
|---|---|---|---|
| 3,585,866 | 6/1971 | Ensinger................................ | 74/5 F |
| 3,614,894 | 10/1971 | Ensinger................................ | 74/5 F |
| 3,700,289 | 10/1972 | Bilinski.................................. | 74/5 F |
| 3,700,290 | 10/1972 | Ensinger............................ | 74/5 F X |
| 3,709,045 | 1/1973 | Krupick et al......................... | 74/5 F |

*Primary Examiner*—Manuel A. Antonakas
*Attorney, Agent, or Firm*—T. W. Kennedy

[57] ABSTRACT

A universal joint gyroscope flexure hinge assembly is provided to interconnect the inertial flywheel of a 2-axes free rotor gyroscope to the gyroscope spin shaft, and which allows two axes of angular freedom. The flexure hinge assembly comprises a symmetrical double universal joint which is constructed to eliminate sources of gyroscope errors. The assembly includes an inner tubular hinge member which is concentrically mounted within an outer tubular hinge member. Each of the two tubular hinge members contains four flexure bars in the embodiment to be described. In accordance with the invention, the flexure bars in each hinge member are alternately positioned for radial and axial flexure. The inner tubular hinge member is configured into a first section which receives the gyroscope spin shaft and into two additional sections which form first and second gimbals. The outer tubular hinge member is configured into a first section which receives the gyroscope inertial flywheel, and into two additional sections which are respectively concentric with the corresponding sections of the inner tubular hinge member and, which cooperate with the corresponding sections of the inner hinge member to form the first and second gimbals. The gimbal sections of the inner and outer hinge members are affixed to one another to form a symmetrical assembly.

5 Claims, 5 Drawing Figures

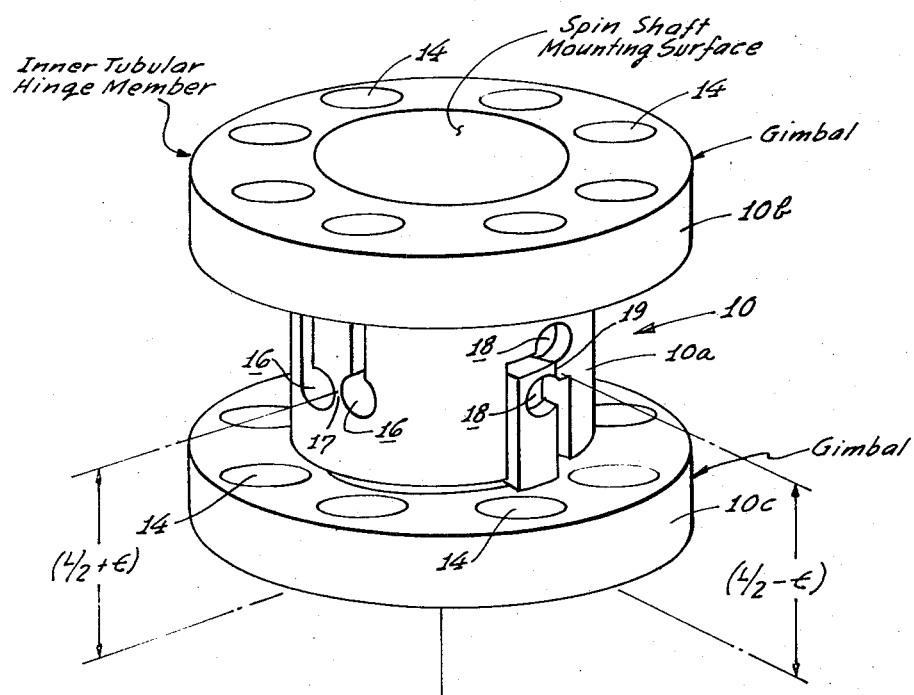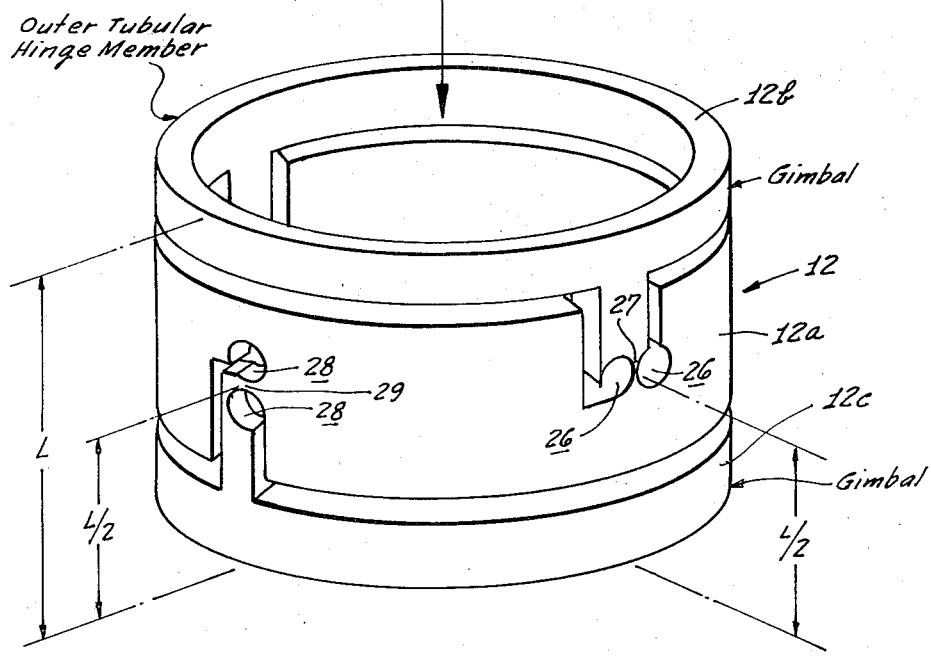

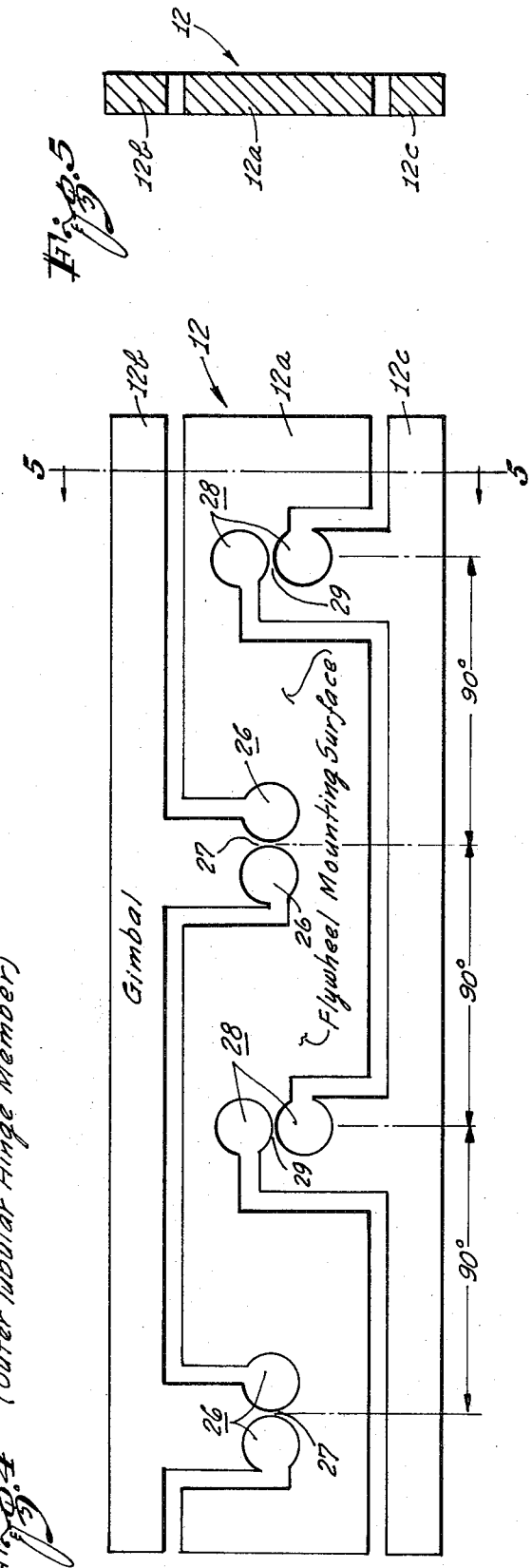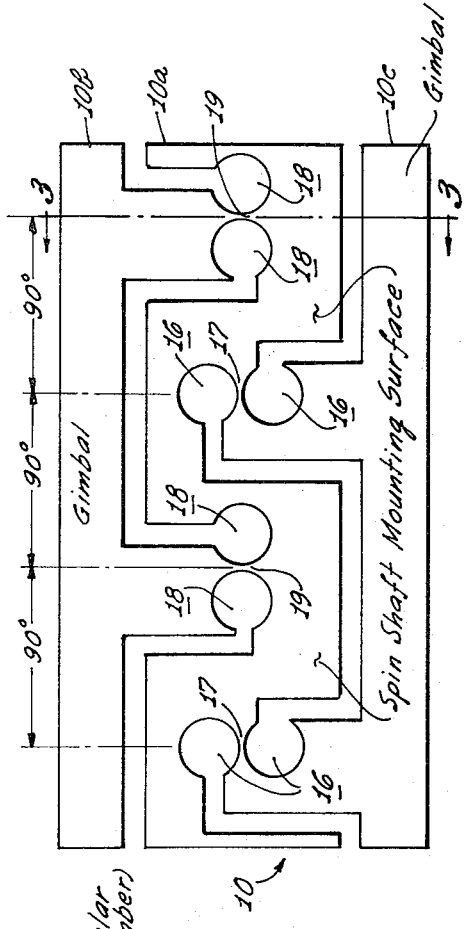

GYROSCOPE UNIVERSAL FLEXURE SUSPENSION ASSEMBLY

BACKGROUND OF THE INVENTION

The present invention is concerned with a gyroscope universal flexure hinge assembly of the type described, for example, in U.S. Pat. No. 3,585,866, which is assigned to the present assignee. The patent describes a flexure hinge suspension assembly for use in a free-rotor displacement type gyroscope, and which comprises an inner tubular hinge member and an outer tubular member concentrically nested within one another and generally coaxial with the spin axis of the gyroscope.

Each of the aforesaid tubular hinge members described in the patent forms a four-bar two-axes universal joint suspension assembly for supporting the inertial flywheel of the gyroscope for rotation about the spin axis. In the prior art assemblies of this general type, such as described in the patent, the outer tubular hinge member has flexure bars with their respective longitudinal axes extending perpendicular to the spin axis, and which serve to support the flywheel against torsional and radial displacements relative to the spin axis. The inner tubular hinge member in the prior art assembly has flexure bars with their respective longitudinal axes oriented parallel to the spin axis so as to support the inertial flywheel against axial displacements along the spin axis.

In the assembly to be described herein, and in the assembly described in the patent, the flexure bars are formed in each of the tubular hinge members by corresponding pairs of closely spaced apertures which extend through the wall of each hinge member. Then, when the two tubular hinge members are nested within one another and rigidly fastened to one another, an appropriate orthogonal alignment between the flexure bars of the inner and outer members is established so that two tubular hinge members may operate in their intended manner.

The prior art flexure hinge assembly of the type described in the patent, has been found to operate satisfactorily. However, in some instances, it has been found to be susceptible to certain errors. Specifically, the prior art structures tend to rectify angular vibrations occurring at twice flywheel speed so as to produce a fixed error torque. In addition, the prior art assemblies also tend to rectify linear vibrations occurring at twice flywheel speed, likewise, to produce a fixed error torque.

The prior art flexure hinge assembly is generally asymmetrical, and large balance weights are required for balance. The prior art flexure hinge assemblies, moreover, are usually complex in their construction and expensive to fabricate.

All of the foregoing drawbacks and disadvantages are obviated in the improved symmetrical flexure hinge suspension assembly of the present invention, as will now be described in detail.

BRIEF DESCRIPTION OF THE DRAWINGS

FIG. 1 is an exploded perspective view depicting the inner and outer tubular hinge members which together make up the gyroscope universal flexure suspension assembly of the invention;

FIG. 2 is a developed view of the inner tubular hinge member of the assembly of FIG. 1;

FIG. 3 is a sectional view taken essentially along the lines 3—3 of FIG. 2;

FIG. 4 is a developed view of the outer tubular hinge member of the assembly of FIG. 1; and FIG. 5 is a section taken essentially along the line 5—5 of FIG. 4.

DETAILED DESCRIPTION OF THE ILLUSTRATED EMBODIMENT

As shown, for example, in FIG. 1, the gyroscope universal flexure suspension assembly in the illustrated embodiment of the invention includes an inner tubular hinge member 10 and an outer tubular hinge member 12. The inner tubular hinge member 10 is nested within the outer tubular hinge member 12 to be coaxial with the spin axis of the assembly. The inner tubular member 10 includes a central hub section 10a, and it includes two end sections 10b and 10c, each of which has an outer diameter greater than the outer diameter of the central hub section 10a. The outer tubular hinge member 12 includes a central section 12a, and two end sections 12b and 12c.

When the inner tubular hinge member 10 is positioned coaxially within the outer tubular hinge member 12, the end sections 10b and 12b are concentric with one another, and together form a first gimbal of the assembly. Likewise, the end sections 19c and 12c are concentric with one another and together form a second gimbal of the assembly. The outer surface of the central section 12a of the tubular member 12 forms a mounting surface for the inertial flywheel of the gyroscope, whereas the inner bore of the inner tubular member 10 forms a mounting surface for the gyroscope spin shaft.

The end pieces 10b and 10c of the inner tubular member may have a plurality of holes 14 therein for receiving threaded balancing weights for final trim and adjustment purposes.

As best shown in FIG. 2, pairs of closely adjacent holes 16 and 18 are formed in the wall of the inner tubular member 10, and these holes are positioned at 90° angular positions around the periphery thereof. The holes 16 form flexure bars 17 which extend essentially perpendicular to the spin axis of the assembly, whereas the holes 18 form flexure bars 19 which extend generally parallel to the spin axis. As shown in FIG. 2, the flexure bars 17 are connected to the section 10c, whereas the flexure bars 19 are connected to the section 10b.

As shown in FIG. 4, the outer tubular member 12 has first pairs of closely adjacent apertures 26 and second pairs of closely adjacent apertures 28 formed at 90° angular intervals about its periphery. The apertures 26 form flexure bars 27 which extend parallel to the spin axis, whereas the apertures 28 form flexure bars 29 which extend generally perpendicular to the spin axis.

The inner and outer tubular members 10 and 12 are slotted, as shown, so that the gimbals formed by the sections 10b, 12b and 10c, 12c, may provide angular freedom about the X- and Y-axes with respect to the spin axis. The section 10b is welded, or otherwise, affixed to the section 12b, and the section 10c is welded, or otherwise affixed to the section 12c. The orientation of the flexures, as described above is such that the shaft-to-gimbal flexures of the gimbals at each end of the assembly are at 90° to one another.

For example, the flexure of the gimbal 10b, 12b may be considered to lie along the Y-axis, and the flexure of the gimbal 10c, 12c may be considered to lie along the X-axis. In this way, 2° of angular freedom, X and Y are provided, and the suspension assembly is composed of two separate universal joints, one providing horizontal (radial) support and the other providing vertical (axial) support.

The flexural restraint on the inertial flywheel can be cancelled at a particular rotor speed by proper sizing of the moments of inertia of the two gimbals about the pivot point. Fine tuning of the assembly can be achieved by using selected weight screws in the tapped holes 14 provided in the inner tubular hinge member. The two gimbals formed by the assembly are symmetrical about the pivot point. The center of gravity of the assembly lies at the pivot point. Therefore, the suspension of the invention cannot rectify linear vibrations in the horizontal plane which occur at twice the rotor frequency.

Also, the two gimbals are rotated 90° with respect to one another, so that the assembly cannot rectify angular vibration in the horizontal plane occurring at twice the flywheel frequency. The horizontal and vertical linear stiffness of the inner and outer tubular hinge members are both high, and they can be matched by properly selecting the widths of the vertical and horizontal flexure bars, this being achieved by selecting proper dimensions for the structures.

Should the gimbal center of gravity for each of the two gimbals of the assembly be displaced from the pivot point of the suspension, a torque on the rotor occurs when the gyroscope is acted upon by a sinusoidal acceleration. This torque is sinusoidal at the excitation frequency and is proportional to the weight of its gimbal, and to the distance of the gimbal center of gravity from the pivot point, as well as to the magnitude of the sinusoidal acceleration. If the vibration frequency is at twice the rotor rotational frequency, the sinusoidal torque is rectified, and a steady state error torque is experienced by the flywheel. Even though the two gimbals in the suspension assembly are symmetrically placed so that they are equal distance from the pivot point, the steady state torque described above does not normally cancel because the gimbals are phased 90° apart relative to the drive shaft. This 90° angular separation of the gimbals is necessary for other purposes, and cannot be changed.

The foregoing is compensated by offsetting the two pairs of hinges on each gimbal. For example, in the compensated assembly, the gimbal flywheel flexure bars 27 and 29 in FIG. 1 are located a distance L/2 from the bottom surface of the outer tubular hinge member; the flywheel is mounted on the central section 12a so that its center of gravity lies within the plane containing the flexure hinges 27 and 29; and the shaft-/gimbal flexure bars 17 and 19 are not at equal distances from the bottom surface of the inner tubular hinge member. For example, the center of the flexure hinge bar 17 is located a distance $L/2 + \epsilon$ from the bottom surface, while the flexure bar 19 is located a distance $L/2 - \epsilon$ from the bottom surface. The distance $\epsilon$ is given by:

$$\epsilon = W_G/W_{FW} \cdot L_G,$$

Where:

$L_G$ = distance of gimbal center of gravity from the pivot point;
$W_G$ = weight of gimbal
$W_{FW}$ = weight of flywheel The invention provides, therefore, an improved and simplified flexure suspension assembly for a gyroscope, which is constructed to provide a completely symmetrical double universal joint, which has the capability of providing equal, relatively high linear stiffness in the radial and axial directions, and in which all known sources of gyroscopic error are eliminated.

While a particular embodiment of the invention has been shown and described, modifications may be made. It is intended in the claims to cover all modifications which come within the spirit and scope of the invention.

What is claimed is:

1. A flexure hinge assembly comprising:
a pair of concentric tubular hinge members attached to one another, each of said hinge members having at least two pairs of adjacent apertures extending through the walls thereof and each of said pairs of apertures forming a flexure bar, the inner tubular hinge member having such flexure bars alternately extending parallel and perpendicular to the longitudinal axis of the assembly, and the outer tubular hinge member also having said flexure bars extending parallel and perpendicular to the longitudinal axis of the assembly with said parallel and perpendicular flexure bars of said outer hinge member located a distance L/2 from the bottom surface of said outer member, and said parallel flexure bars of said inner member and said perpendicular flexure bars of said inner member located at different distances of the bottom surfaces of said inner members;
said inner tubular member being slotted to form a first gimbal at one end thereof connected to the perpendicular flexure bars of said inner tubular members and a second gimbal at the other end thereof connected to the parallel flexure bar of said inner members; and said outer tubular member being slotted to form a gimbal at one end thereof concentric with the first gimbal and connected to the perpendicular flexure bar of said outer member, and a gimbal at the other end thereof concentric with said second gimbal and connected to the parallel flexure bars of said outer members.

2. The flexure hinge assembly defined in claim 1, in which the respective gimbals at the ends of said outer tubular member are respectively attached to the first and second gimbals at the ends of said inner tubular member.

3. The flexure hinge assembly defined in claim 1, in which the first and second gimbals each have an outer diameter greater than the outer diameter of the remaining portion of said inner tubular member.

4. The flexure hinge assembly defined in claim 3, in which said first and second gimbals have apertures therein for receiving compensating weight members.

5. The flexure hinge assembly defined in claim 1, in which said parallel flexure bars of said inner member are located a distance $L/2 + \epsilon$ from said bottom surface and said perpendicular flexure bars of said inner member are located a distance $L/2 - \epsilon$ from said bottom surface, where $\epsilon = W_G/W_{FW} \cdot L_G$, and $W_G$ is the weight of the second gimbal, $W_{FW}$ is the weight of the flywheel, and $L_G$ is the distance of the center of gravity of the second gimbal from the pivot point.

* * * * *